United States Patent [19]

Namba

[11] Patent Number: 4,589,144
[45] Date of Patent: May 13, 1986

[54] CHARACTER AND IMAGE PROCESSING APPARATUS

[75] Inventor: Hiromi Namba, Tokorozawa, Japan

[73] Assignee: Tokyo Shibaura Denki Kabushiki Kaisha, Kawasaki, Japan

[21] Appl. No.: 448,324

[22] Filed: Dec. 9, 1982

[30] Foreign Application Priority Data

Dec. 15, 1981 [JP] Japan .................. 56-201840

[51] Int. Cl.$^4$ .......................... G06K 9/20
[52] U.S. Cl. .................. 382/61; 235/436; 250/557; 364/518; 382/9
[58] Field of Search .......... 382/61, 9, 47; 358/257; 364/523, 518; 250/556, 557; 235/436, 462

[56] References Cited

U.S. PATENT DOCUMENTS

| | | | |
|---|---|---|---|
| 3,496,543 | 2/1970 | Greenly | 382/9 |
| 3,930,237 | 12/1975 | Villers | 364/518 |
| 3,976,982 | 8/1976 | Eiselen | 382/47 |
| 4,021,777 | 5/1977 | Shepard | 382/61 |
| 4,300,123 | 11/1981 | McMillin et al. | 382/61 |

FOREIGN PATENT DOCUMENTS

| | | | |
|---|---|---|---|
| 2462072 | 2/1981 | France . | |
| 55-154871 | 5/1979 | Japan | 382/61 |
| 55-25222 | 2/1980 | Japan | 358/257 |
| 57-45777 | 3/1982 | Japan | 382/61 |

OTHER PUBLICATIONS

Patents Abstracts of Japan, vol. 5, No. 74 (E-57) [746], May 16, 1981.
Patents Abstracts of Japan, vol. 5, No. 86 (E-60) [758], Jun. 5, 1981.
Computer Design, "OCR Page Reader Recognizes Common Fonts, Skips Unreadable Data", vol. 18, No. 11, Nov. 1979, p. 68.

Primary Examiner—Leo H. Boudreau
Assistant Examiner—Joseph Mancuso
Attorney, Agent, or Firm—Cushman, Darby & Cushman

[57] ABSTRACT

A character and image processing apparatus comprises a scanning section for photoelectrically converting data on a sheet in which character data and image data are mixedly arranged in a free format; an image buffer for storing the photoelectrically converted data; a scanning control circuit for scanning the stored data in the image buffer to detect control marks and for determining a character read mode, an image data output mode or a skip mode according to the control mark; a character recognizing circuit for recognizing characters from the image buffer when the scanning control circuit determines the control marks as the character read mode; a data compression circuit for compressing the image data from the image buffer when the scanning control circuit determines the control marks as the image data output mode; and a data editing circuit for discriminately editing the character data and the image data.

12 Claims, 26 Drawing Figures

CHARACTER AND IMAGE PROCESSING APPARATUS

BACKGROUND OF THE INVENTION

This invention relates to a character and image processing apparatus having combined functions of an optical character reader (hereinafter referred to as OCR) and a facsimile (hereinafter referred to as FAX).

Recently, a character and image processing apparatus having combined functions of the OCR and the FAX has been developed, which recognizes character data and image data on a sheet to provide coded character data and non-coded image data (except for coding for data compression) to a host computer, for example.

However, in a prior-art character and image processing system, positions of character data to be read out and image data to be scanned on a slip should be pre-stored in the apparatus as format control data. This system is suitable for such applications in which a large quantity of sheets having the same formats are processed, but is not suitable for a text entry in which sheets having different formats are processed.

SUMMARY OF THE INVENTION

An object of the present invention is to provide a character and image processing apparatus in which a character-coded data output area and an image data output area can be arbitrarily and directly specified on a document (including sheets) thereby enabling the processing of a document having a free format.

According to the present invention, the following advantages can be achieved.

(1) Data of a sheet in which characters and figures are mixedly arranged in a free-format can be input to an external device such as a host computer.

(2) The vertical and horizontal data areas to be input can be arbitrarily specified on a sheet by the control marks.

(3) The marking of the control mark can be facilitated. When a pencil is used for the marking, the mark can be erased easily.

BRIEF DESCRIPTION OF THE DRAWINGS

Other objects and features of the present invention will be apparent from the following description taken in connection with the accompanying drawings in which:

FIGS. 12A through 12H are schematic views of modifications of area designations wherein

DETAILED DESCRIPTION OF THE PREFERRED EMBODIMENT

Now an embodiment of the present invention will be described.

Figure 1:
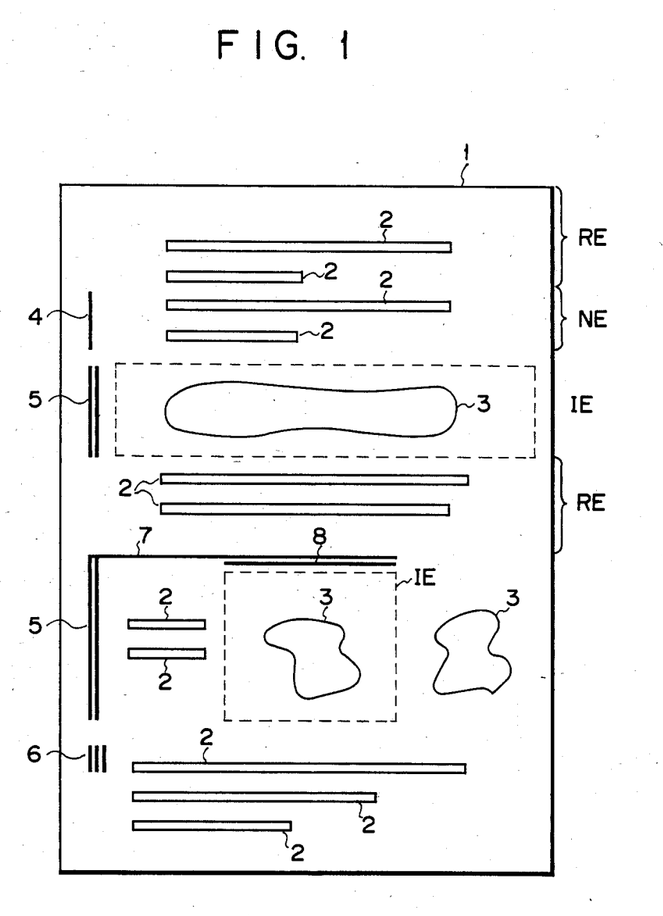
FIG. 1 is a schematic view showing an example of a sheet 1 to be read by the apparatus of this invention.

FIG. 1 shows an example of a document 1 to be read by the apparatus of the invention. The document 1 has lines of characters 2 and FIGS. 3. Vertical bars (hereinafter referred to as VB) 4, 5, 6 serving as control marks are drawn vertically in blank areas at the left side of the sheet. Positions and the number of these VBs specify areas and processing modes (character read mode, image scanning mode and skip mode which are described later), respectively. When no VB is marked in the blank area at the left side of the document, the right side area thereof is specified as a character read area RE. When a single VB is marked such as VB 4, the right side area corresponding to the VB is specified as non-read area NE. Similarly, the double VBs such as VB 5 specify an image output area IE. The control mark of triple VBs such as VB 6 indicates completion of processing. In case of the image scanning mode, the range of an image area to be scanned in a horizontal direction is determined by horizontal bars (hereinafter referred to as HB) 7, 8 as control marks one of which is drawn in a horizontal right direction from the top of the double VBs 5 to facilitate the pursuit. That is, when the double VBs 5 and no HBs are marked, the corresponding whole area at the right side of the sheet is specified as the image output area. When the double VBs 5 and single HB are marked, the area corresponding to the area beneath the HB is specified as the image output area. Further, when double VBs and double HBs are marked (the left end of the HB 7 is connected to the upper end of the VB), such as HBs 7 and 8, the area beneath the HB 8 is specified as the image output area IE.

Figure 2:
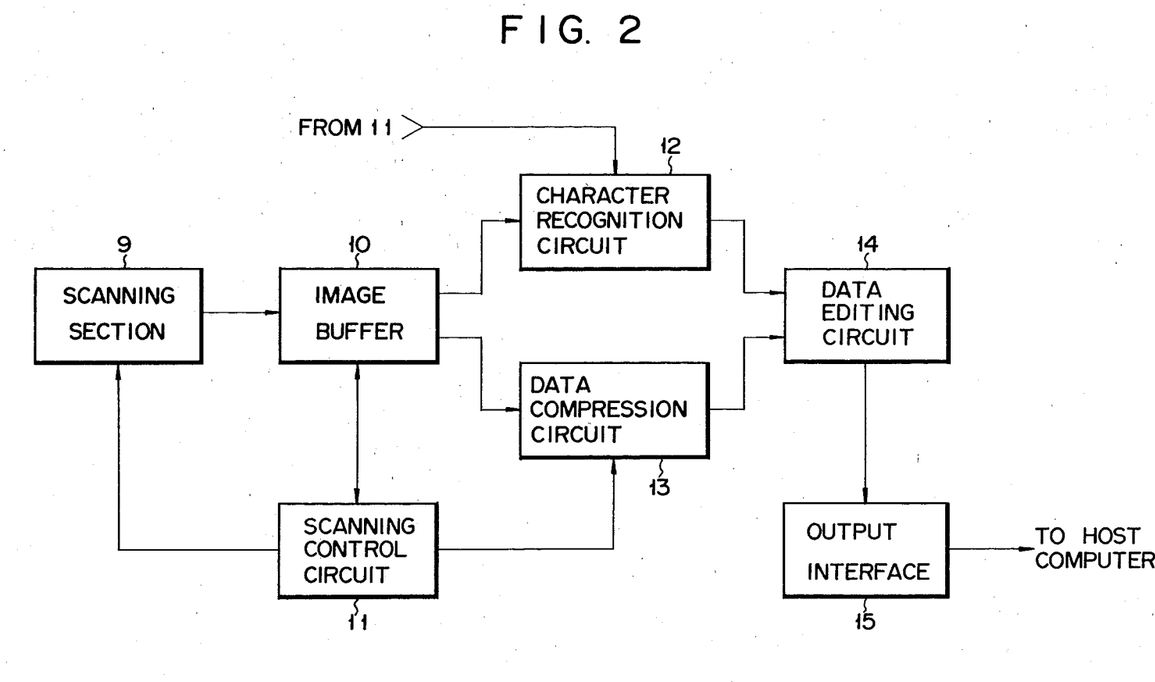
FIG. 2 is a block diagram showing an embodiment of the invention.

FIG. 2 is a block diagram showing an embodiment of the present invention. A scanning section 9 performs main-scanning and sub-scanning of the sheet in horizontal and vertical directions, respectively. The output of the scanning section 9 is coupled to an image buffer 10 which temporarily stores scanned pattern data from the scanning section 9. A scanning control circuit 11 controls the image buffer 10 to store the scanned pattern data and scans the stored pattern data to detect a control mark. According to the control mark, the scanning control circuit 11 discriminates a character read mode, an image input mode or a non-read mode and performs processing corresponding to a selected mode. The output of the image buffer 10 is coupled to respective inputs of a character recognition circuit 12 and a data compression circuit 13. Switching control signals from the scanning control circuit 11 are also applied to the character recognition circuit 12 and to the data compression circuit 13. The switching control signals are used for distributing data from the image buffer 10 to the character recognition circuit 12 or to the data compression circuit 13. The character recognition circuit 12 recognizes character pattern data from the image buffer 10 under the control of the scanning control circuit 11. The detailed description of the construction and the operation of the character recognition circuit 12 is referred to in, for example U.S. Pat. No. 3,688,267. The data compression circuit 13 compresses the scanning pattern data from the image buffer 10 under the control of the scanning control circuit 11. Both outputs of the character recognition circuit 12 and of the data compression circuit 13 are coupled to a data editing circuit 14 which edits data from the character recognition circuit 12 or from the data compression circuit 13 in a predetermined data format. The edited data from the data editing circuit 14 is output to an external device such as a host computer through an output interface 15.

Figure 3:
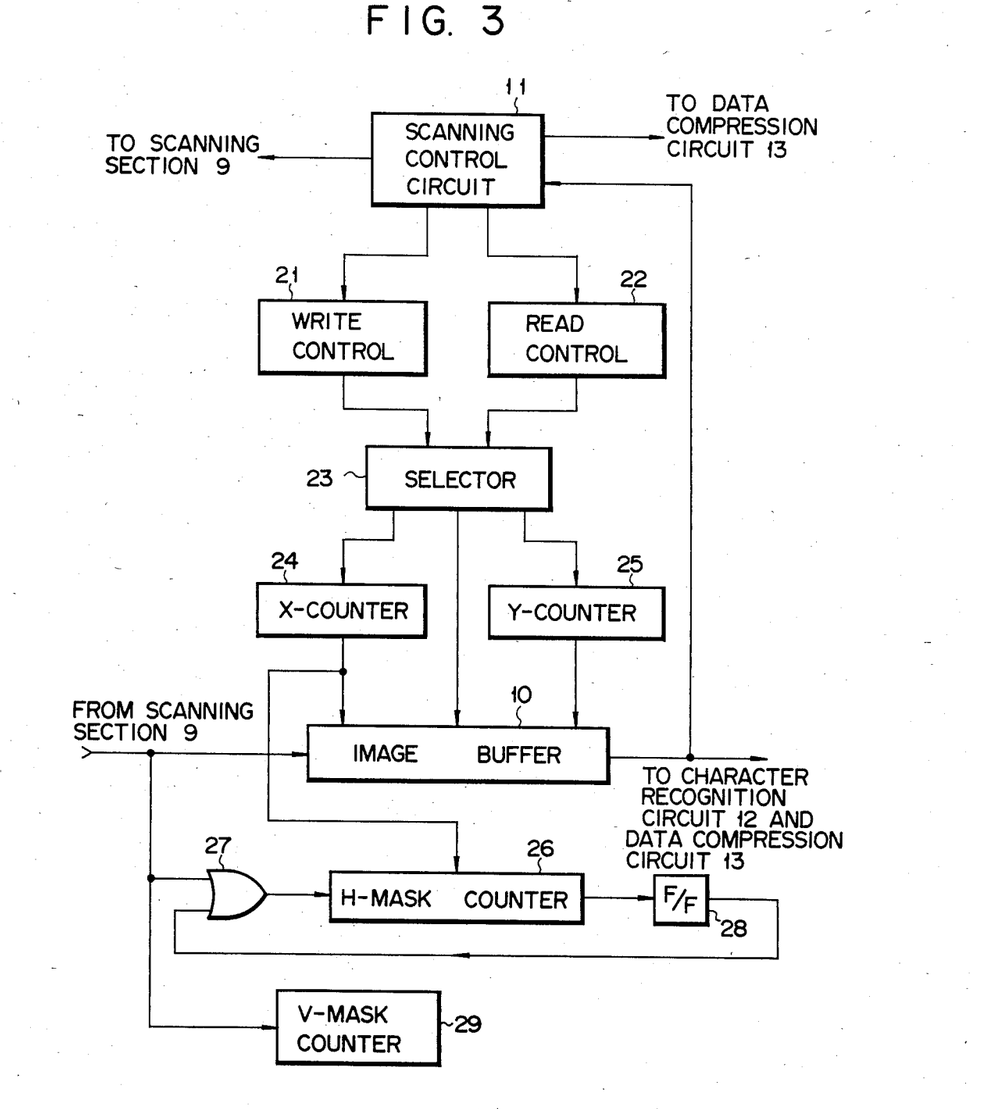
FIG. 3 is a block diagram showing circuits between the scanning control circuit and the image buffer.

FIG. 3 is a block diagram showing circuits between the scanning control circuit 11 and the image buffer 10. Outputs of the scanning control circuit 11 are connected to a write control circuit 21 and a read control circuit 22, respectively. When writing the scanned data into the image buffer 10, the scanning control circuit 11 supplies write control signals to the write control circuit and when reading the data from the image buffer 10, the circuit 11 supplies read control signals to the read control circuit 22. The outputs of the write control circuit 21 and the read control circuit 22 are connected to an X-counter 24 and a Y-counter 25 respectively through a selector 23. The X-counter 24 is cleared before starting the main-scanning and is incremented during the main-scanning. The contents of the X-counter 24 and the Y-counter 25 represent the X and Y coordinates on the sheet, respectively. Those contents of the counters 24, 25 are supplied to the image buffer 10 as an image buffer address. The Y coordinate may be the modulus value of $2^n$ (n: integer). Furthermore, the output from the X-counter 24 is supplied to an H-mask counter 26. Further, the output signal from the scanning section 9 is supplied to the H-mask counter 26 through an OR gate 27 as well as to a V-mask counter 29. The output from the H-mask counter 26 is latched by a flip-flop 28, and then, through the OR gate, fed back to the counter 26. The V-mask counter 29 is cleared immediately before starting the main-scanning and counts the number of logical "1" bits during the main-scanning. The logical "1" bit and logical "0" bit represent the existence and non-existence of a picture element, respectively. The contents of the counter 29 is read into the scanning control circuit 11 when the main-scanning is completed. The H-mask counter 26 is used for making projections of the pattern stored in the image buffer in the subscanning direction, thereby detecting characters.

The operation of writing data into the image buffer 10 is as follows. First, in step 31 of FIG. 4 the scanning control circuit 11 waits for the end timing of a main scan. This step is executed for achieving initial timing of the apparatus. If it is completed, in step 32, the write control circuit 21 clears the H-mask counter 26 and turns on the image buffer (IB) write mask. In step 33, the write control circuit 21 waits for the end timing of a main scan. At the end of timing, the write control circuit 21 supplies a pulse to a stepping motor (not shown) and increments the Y-counter 25. In step 35, the write control circuit 21 reads the V-mask counter 29 and detects the line by a line projection. Further, in step 36 when the write control circuit 21 determines that the write operation should be continued, the control is returned to step 33 to repeat steps 33 through 35.

Figure 4:
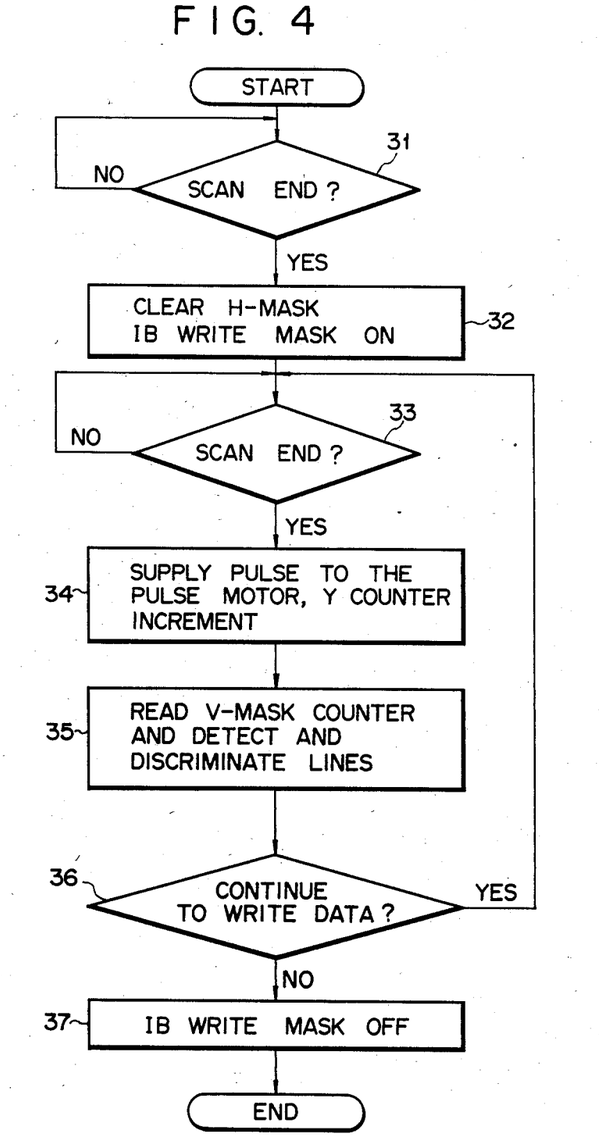
FIG. 4 is a flow chart showing the operation of writing data into the image buffer.

On the other hand, when the write operation should not be continued, the circuit 21 turns off the image-buffer write-mask. That is, when the line is detected or when the amount of continuous line projection to be written into the image buffer reaches a predetermined value, the write operation is interrupted.

The operation of reading data from the image buffer 10 is as follows. The reading operation is performed by setting addresses to the X-counter 24 and Y-counters 25. The scanning for the image buffer 10 can be performed by setting a start point (X, Y) and incrementing X or Y.

In case of character detection, characters are stored in the image buffer and the vertical and horizontal projections are computed so that positions of characters can be detected.

Figures 5, 6:
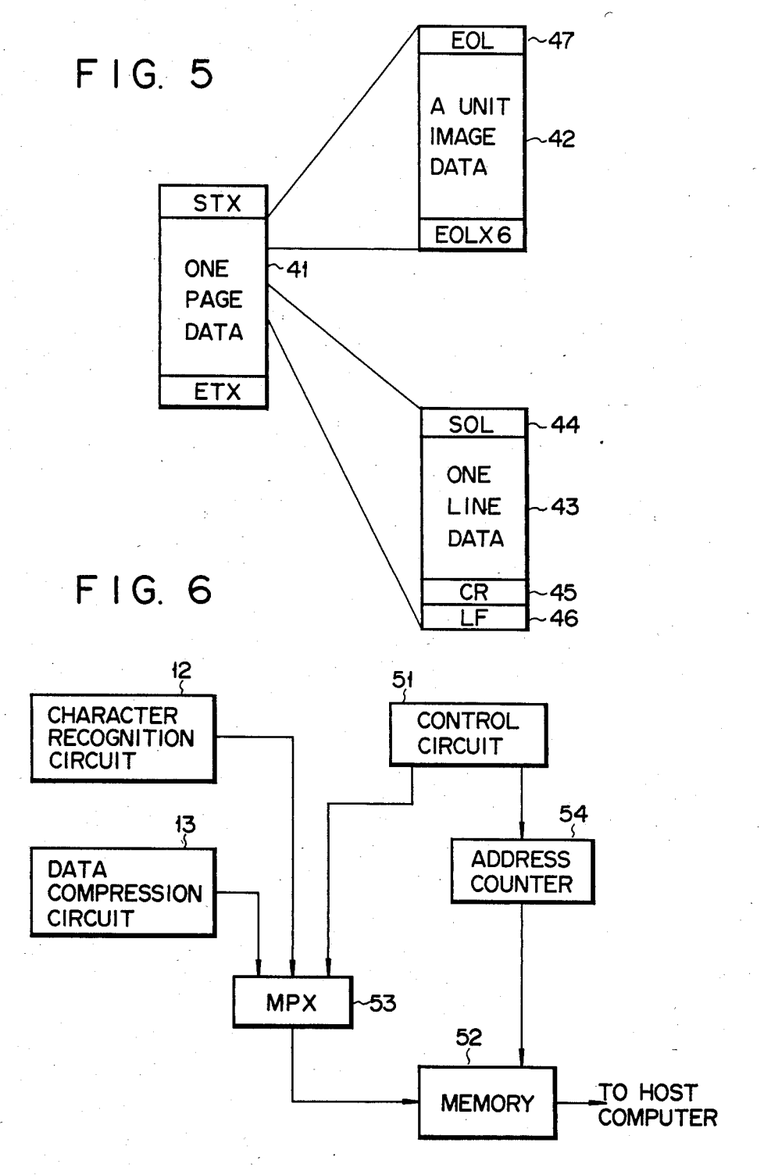
FIG. 5 is a conceptional view showing the function of a data editing circuit shown in FIG. 2.
FIG. 6 is a detailed block diagram of the data editing circuit.

The data editing circuit 14 edits one page data including character data and image data in the image buffer 10 to one-line data format and a unit image data format as shown in FIG. 5. That is, control codes are attached to the one-line data and a unit image data. These control codes are for discriminating the character data area and the image data area. In the figure, SOL stands for start of line, CR stands for carriage return, LF stands for line feed and EOL stands for end of line. SOL, CR and LF codes are included in ASCII code and EOL code is the standard code defined by CCITT.

FIG. 6 shows a detailed block diagram of the data editing circuit 14. The data editing circuit 14 includes a control circuit 51 which comprises a microprocessor, for example an 8-bit microprocessor Intel 8085, Intel Corp. U.S.A. The character data from the character recognition circuit 12 or the image data from the data compression circuit 13 are stored into the memory 52 through the multiplexer 53 under the control of the select signal from the control circuit 51 in accordance with the address from the address counter 54 connected to the control circuit 51.

Now the operation of the above embodiment will be described. First, the pattern scanned by the scanning section 9 is stored in the image buffer 10. The scanning section 9 main-scans and sub-scans in a horizontal direction and in a vertical direction to a line, respectively. The pattern stored in the image buffer 10 is scanned by the scanning control circuit 11 to detect the control mark (VB). When the scanning control circuit 11 determines the pattern as a character-read area, detections of characters of a line and number of lines are performed. The character recognition circuit 12 recognizes the pattern and produces the corresponding character codes.

On the other hand, when the scanning control circuit 11 determines the pattern as an image output area, the circuit detects HB to determine the image area. The scanned pattern of the determined image area are transferred from the image buffer 10 to the data compression circuit 13. The data compression circuit 13 converts the pattern to one-dimensional Modified Hoffman (MH) codes to data-compress the pattern. The detailed description of the MH conversion is well known to any person skilled in the art to which it pertains and therefore it is omitted. The processed data from the character recognition circuit 12 or the data compression circuit 13 are transferred to the data editing circuit 14. The data editing circuit 14 edits the received data into a predetermined format to provide an external device such as a host computer through the output interface 15. Furthermore, when the scanning control circuit 11 determines the pattern as a non-read area or determines that the processing for the pattern within the image buffer is completed, the circuit 11 controls the scanning section 9 to re-start the scanning and to supply the next scanned data to the image buffer 10. Then the circuit 11 continues the same processing as described above. When the scanning control circuit 11 detects the trailing edge of the sheet or a sheet end mark VB 6 positioned at the left side of the sheet, the circuit 11 completes the read operation for the sheet and forwards to the next-sheet read operation.

Figure 7A:
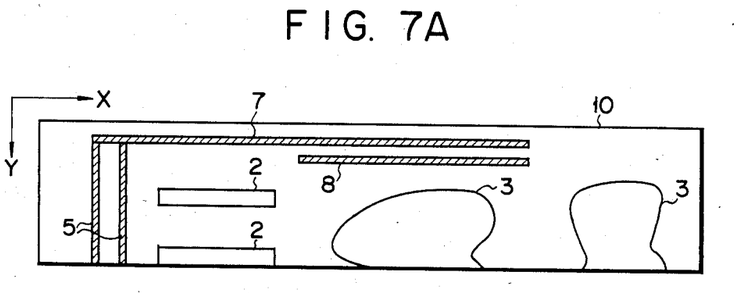
FIGS. 7A through 7D are schematic views showing the operation of the scanning control circuit.

Now an operation for detecting the VB and the HB as control marks by the scanning control circuit 11 will be described referring FIGS. 7A through 7D. FIG. 7A shows patterns to be scanned including VB 5, and HBs 7 and 8.

(1) Detection of upper position of the control marks

The detection of the upper position is performed by a predetermined-length of X directional scanning from top to bottom at left side of the sheet. When a pattern exists at right side of the sheet, while no control mark exists, the scanning control circuit 11 recognizes the corresponding area as character read area and detects characters of one line and number of lines.

Figure 7B:
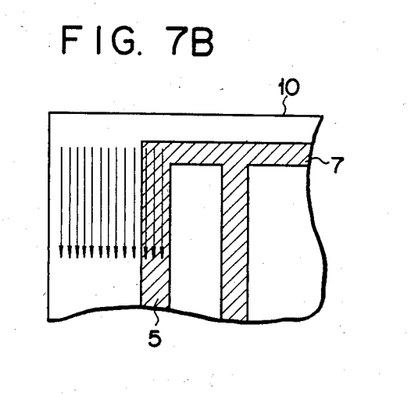

(2) Detection of control mark in a horizontal position (X-coordinates)

As shown in FIG. 7B, starting from the upper position of the control mark 7, a constant-length of Y directional scanning is continuously performed in a X-direction by the scanning control circuit 11. The scanning control circuit 11 counts the logical "1" bits for each scanning to make a histogram. Therefore, the respective left-end and right-end positions of the first VB from the left side of the sheet are obtained. By continuing the scanning, the presence and positions or absence of the second and third VBs are obtained.

Figure 7C:
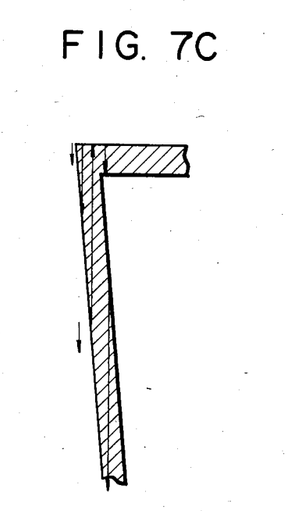

(3) Pursuit of control mark

As shown in FIG. 7C, a scanning for the pursuit is performed at a plurality of positions in a Y-direction starting from the center position between the left-end and right-end of the left-most vertical bar of the sheet. The scanning is continued until the logical "0" bit appears. The longest of the pursuit scans is adopted. Then, from both positions equally-distanced from the end of the adopted scan at a predetermined level, the scanning control circuit 11 restarts the pursuit in the same manner. Then, the longest scan is adopted again. The above operations are repeated until the pursuit cannot be continued. When the pursuit cannot be continued, the position of the final scan can be determined as the bottom of the control mask. When the pursuit position in a Y-direction reaches the final write position in the image buffer 10, the scanning control circuit 11 interrupts the pursuit and stores the coordinates of the position in a predetermined storage area thereof.

The character and image processing is performed in accordance with the number of lines and positions of the control mark described above. When a single VB is detected such as VB 4, data at the right side of the sheet corresponding to the VB are not processed. Then, next processing is continued from the bottom of the VB. Furthermore, when the triple VB, or a trailing edge of the sheet mark is detected, the scanning control circuit 11 sends the corresponding sheet-end mark data to the data editing circuit 14 to perform the sheet-end processing.

When the scanning control circuit 11 detects the double VB such as VB 5, the image output mode is set. Then, the scanning control circuit 11 further performs the following processings:

(4) Detection of horizontal bar (HB)

Pursuit is performed in an X-direction near the top of the detected VB to detect the HB connected thereto.

Figure 7D:
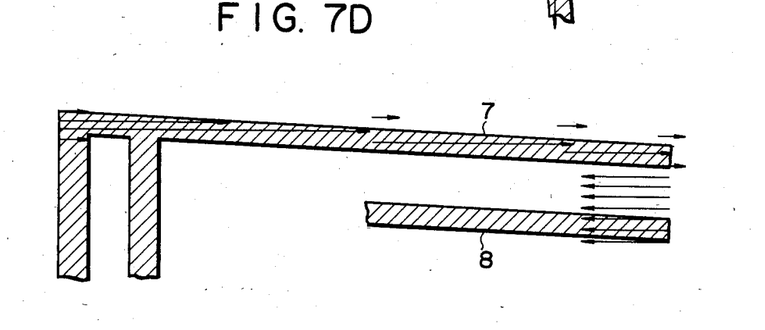

(5) Detection of second HB

As shown in FIG. 7D, a raster-scan is performed in a left direction from the right end of the first HB 7 to detect the second HB 8. When the second HB 8 is detected, the pursuit is performed in a left-direction to detect the left-end position of the HB 8. The scanning control circuit 11 determines the image output area IE from the positions in X and Y directions obtained from the above processing steps (4) and (5), and then performs the raster-scan of the area IE in the X-direction to transfer the raster-scanned data to the data compression circuit 13.

When the VB already reaches to the final write position of a Y direction in the image buffer 10, the image data stored in the image buffer 10 are output to the data compression circuit 13 and then the remaining image data is stored. Therefore, the scanning control circuit 11 re-starts the pursuit from the X and Y coordinates of the pursuit-interrupted point stored in the image buffer 10.

In the embodiment described above, a vertical bar is used as a control mark. However, as the embodiment shown in FIG. 8, the scanning control circuit 11 may alternatively switch the character-read mode and the image-output mode in accordance with the hand-written or printed timing mark 16.

Figure 8:
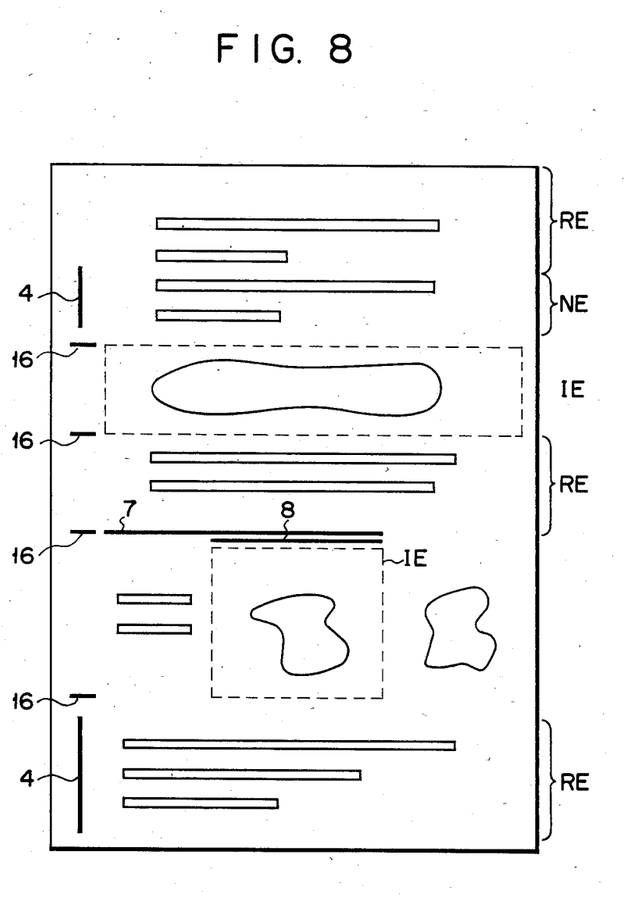
FIG. 8 is a schematic view showing another example of a sheet 1.

In the embodiment in FIG. 8, upon detecting the upper edge of the sheet, the scanning control circuit 11 sets the mode to a character-read mode. Then, the circuit switches the mode to the image-output mode upon detecting the first timing mark 16. In this manner, each time the circuit 11 detects the timing mark 16, it alternatively switches the mode. By combining the functions of the skip by the single bar and the image output by the double horizontal bars, the same effect can be achieved as the first embodiment.

In the above embodiment a single VB is used for representing the skip area. However, the single bar may represent the character-read area and the single HB may represent the skip area.

Figure 9:
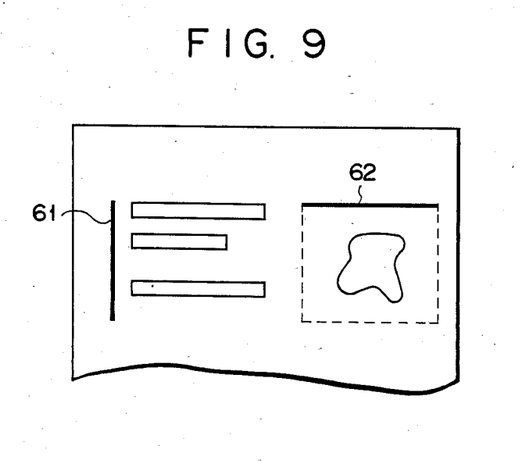
FIG. 9 is a schematic view of a sheet showing modifications of vertical and horizontal bars.

Furthermore, when characters and images are positioned in a same line, inputs of characters only is impossible. FIG. 9 shows a modification of VB and HB. In the modification, the VB 61 and the HB 62 represent a character-read area and a skip area, respectively. Therefore, it is possible to input only characters as the image output area is skipped. The HB 7 is not always necessarily connected to the VB 5 but may be separated from the VB5 as shown in FIG. 10A.

Figure 10A:
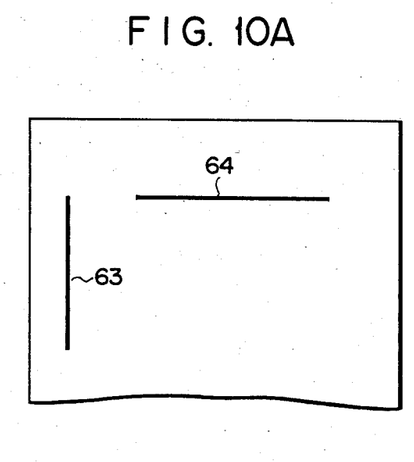
FIGS. 10A and 10B are schematic views showing modifications of entries of vertical and horizontal bars.
Figure 11A:
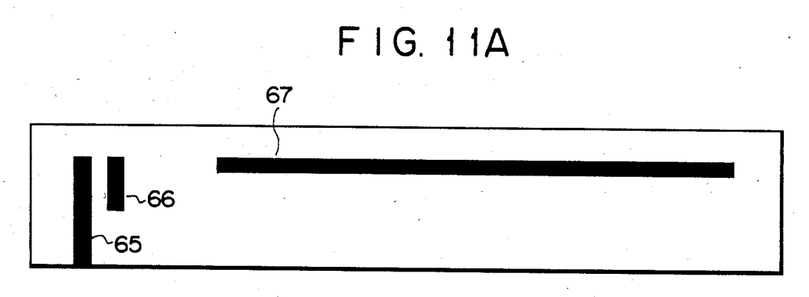
FIGS. 11A through 11D are schematic views showing detections of the control mark shown in FIG. 10A.
Figure 11B:
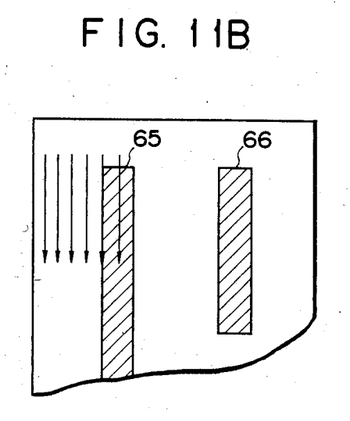
Figure 11C:
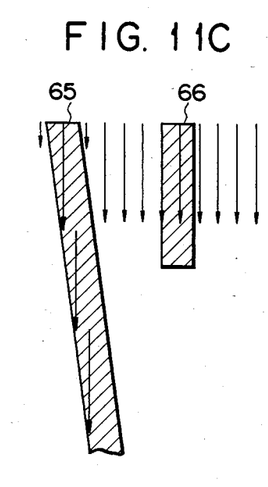
Figure 11D:
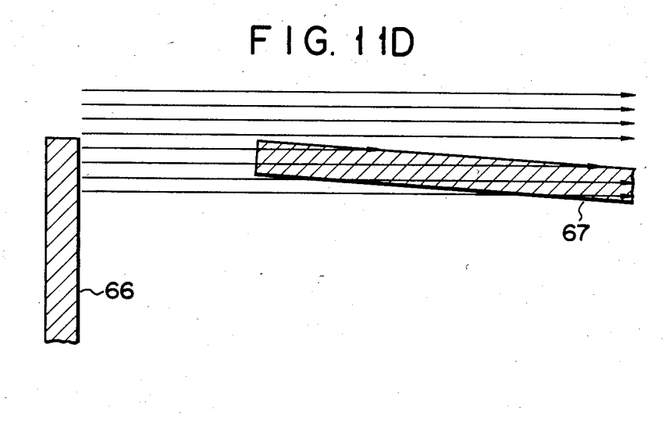

The detection of the VB 63 and HB 64 shown in FIG. 10A can be performed in a same manner as described in FIGS. 7A through 7D. FIG. 11A shows the scanned VB 65 and HB 66 stored in the image buffer 10. The VB 65 can be detected by performing the pursuit of the image buffer 10 from left to right as shown in FIG. 11B. Further, as shown in FIG. 11C, the pursuit of the VBs 65 and 66 is performed to determine the number of VBs 65 and 66. On the other hand, to detect the HB 67, the pursuit is performed at near the top of the VB 66. The pursuit is continued until a predetermined length of a logical "1" bit string is found. To detect the HB 67, the same pursuit as the VB 65 is performed from the left-most logical "1" bit block. Further, the determination of the number of HBs may be performed in a same manner as that of the VBs. As for the detection of HB, width of the bar is also detected. The width detection is performed by scanning the HB 67 in a width direction and computing the projections. Further, the width detection can be determined in accordance with the number of the scanning lines.

Figure 10B:
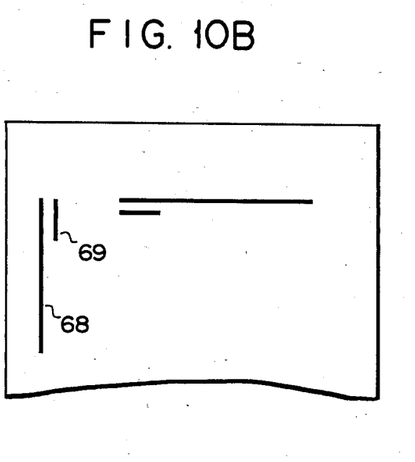
Figure 12A:
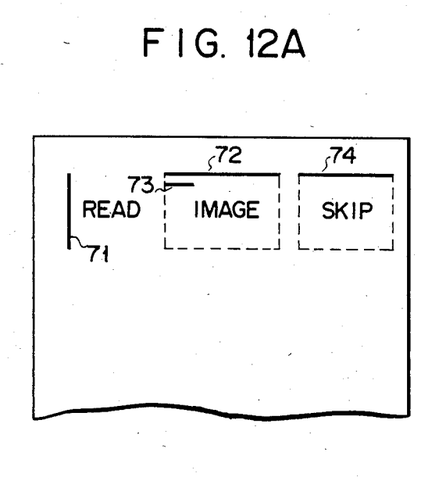
FIG. 12A shows the combination of a character read mode, an image scanning mode and a skip mode.
Figure 12B:
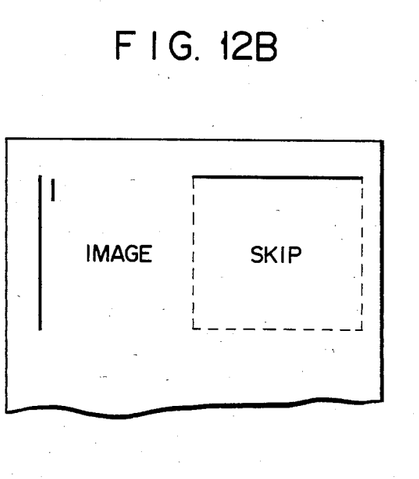
FIG. 12B shows the combination of two different modes and FIGS. 12C through 12H show various examples representing combinations of the two modes in the multiplexed designations in FIG. 12A.
Figure 12C:
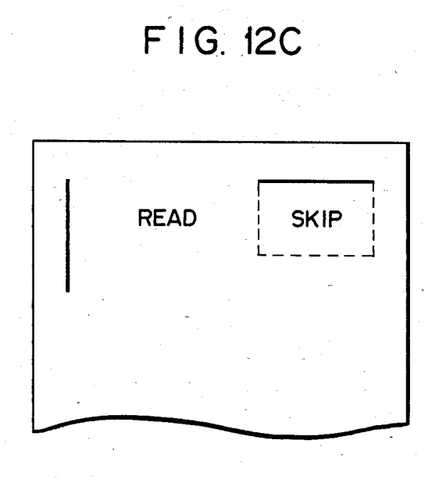
Figure 12D:
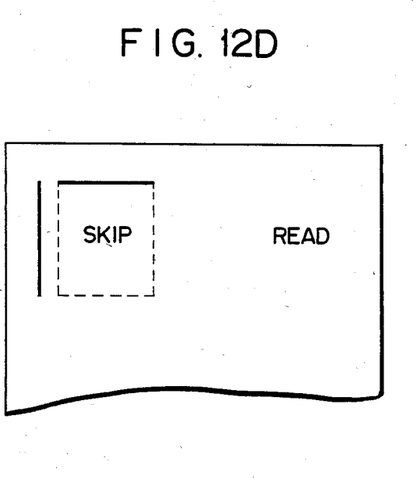
Figure 12E:
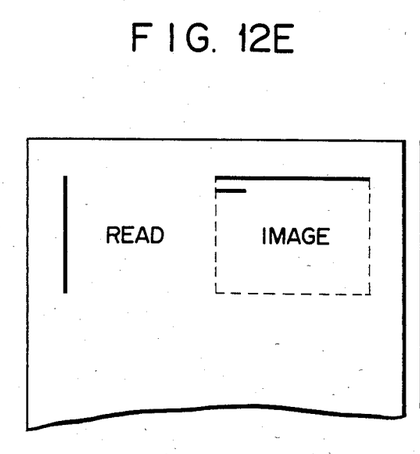
Figure 12F:
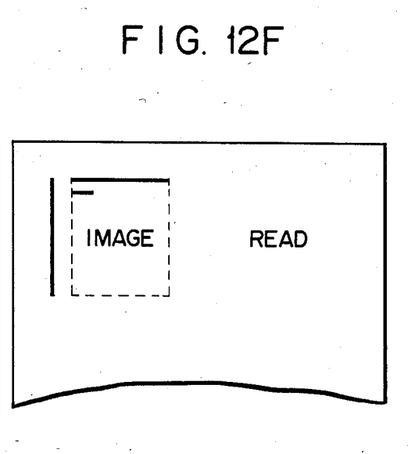
Figure 12G:
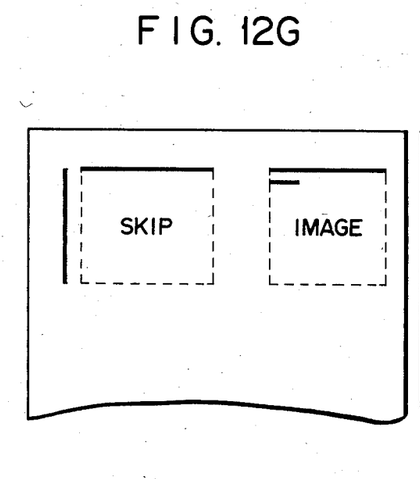
Figure 12H:
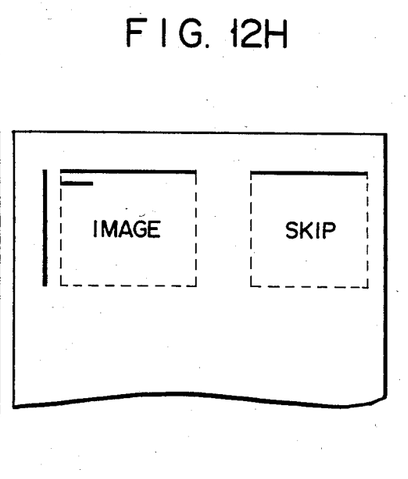

Further, as shown in FIG. 10B, when the double bars 68, 69 are marked, the second one 69 can be shorter than the first, thereby facilitating the marking and the detection. Further, multiplexed designations are possible as shown in FIGS. 12A and 12B. FIG. 12A shows the combination of three different modes. The VB 71 represents the character-read area, the long and short horizontal bars 72 and 73 represent the image output area and the single horizontal bar 74 represents the skip area. FIGS. 12C through 12H show various modifications representing the combinations of the two modes in the multiplexed designations in FIG. 12A. In FIGS. 12C through 12H, "READ" stands for character-read area, "SKIP" stands for skip area and "IMAGE" stands for image output area.

FIG. 12B shows an example of combining two modes, that is image output mode and skip mode. The number of areas in a horizontal direction is not limited to three. When the character-read data and the image-output data to be stored exceed the capacity of the image buffer, a sheet buffer provided in the memory 52 can be used for a substitute.

Further, the vertical and horizontal bars in the above embodiments can be substituted for marks similar to the VB, HB, or symbols.

Although only one exemplary embodiment of this invention has been described in detail above, those skilled in the art will readily appreciate that many embodiments are possible in the exemplary embodiment without materially departing from the novelty teachings and advantages of this invention.

Accordingly, all such modifications are intended to be included within the scope of this invention as defined in the following claims.

What is claimed is:

1. An apparatus for processing a printed sheet, said apparatus comprising:
    scanning means for scanning the sheet and for photoelectrically converting the information printed on said sheet to data;
    storage means for storing the photoelectrically converted data;
    a plurality of bars, imprinted on said sheet in a longitudinal direction and a lateral direction with respect to a predetermined dimension of said sheet, for specifying both the range of data to be processed in two coordinate dimensions and one of a character read-out mode and an image data read-out mode, the number of said plurality of bars printed on said sheet encoding one of a plurality of predetermined commands, said plurality of commands including a character processing command, a skip command, an image processing command and an end of processing command;
    control means for reading the data stored by said storage means to detect indicia of said bars and for selecting one of the character mode and the image data read-out mode according to said indicia of said bars;
    character recognizing means for recognizing characters from data stored by said storage means when said control means selects said character read-out mode; and
    image data processing means for processing data stored by said storage means as image data when said control means selects the image data read-out mode,
    wherein said control means also disables both said character recognizing means and said image data processing means from processing data corresponding to indicia read from areas of said sheet within the range delimited by said bars encoding said skip command, and causes said apparatus to terminate processing of said data read from said sheet in response to said end of processing command.

2. An apparatus as in claim 1 wherein:
    the range of data to be read from said sheet is determined by the length of one of said plurality of printed bars; and
    said control means selects between the character read-out mode and the image data read-out mode depending upon the number of bars printed on said sheet.

3. An apparatus as in claim 2 wherein a change in the number of bars printed on said sheet represents an end code indicating termination of processing in one of the character read-out mode and the image data read-out mode.

4. An apparatus as in claim 2 wherein when a plurality of characters and a plurality of images are printed on said sheet in the same line, the image data read-out mode is specified by at least one lateral bar and at least one longitudinal bar and the range of a specific image to be processed is specified by at least one bar the direction of which is different from that of the bar specifying the image data read-out mode.

5. An apparatus as in claim 1 wherein:
    each bar comprises a timing mark printed on a blank area of said sheet; and
    said control means alternately switches between the character read-out mode and the image data read-out mode every time said timing mark is detected.

6. An apparatus as in claim 1 wherein said control means selects the character read-out mode when no bar is printed on said sheet.

7. An apparatus as in claim 1 wherein said control means disables processing of data in response to a change in the number of bars printed on said sheet.

8. A system for automatically reading information imprinted on a medium, said system comprising:
    a medium imprinted with information, said imprinted information including means for delimiting areas of said medium to be processed, said delimiting means comprising a subset of a plurality of possible printed bars, the length of said bars delimiting the range of said areas in two coordinate dimensions, the number of said bars encoding one of a plurality of predetermined commands, said plurality of commands including a character processing command, a skip command, an image processing command and an end of processing command;
    scanning means for optically reading said imprinted information and for converting said read information into electrical signals;
    decoding means, connected to receive said electrical signals, for decoding said command from the number of bars read by said scanning means and for selecting between a character processing mode and an image processing mode in response to said decoded command;

character processing means, connected to receive said signals, for processing information read from areas of said medium delimited by said delimiting means as character symbols when said decoding means selects said character processing mode; and image processing means, connected to receive said signals, for processing information read from areas of said medium delimited by said delimiting means as image patterns when said decoding means selects said image processing mode, wherein said decoding means disables both said character processing means and said image processing means from processing signals corresponding to information read from areas of said medium delimited by said delimiting means encoding said skip command, and causes said system to terminate processing of said information read from said medium in response to said end of processing command.

9. A system as in claim 8 wherein:

said plurality of possible printed bars comprise a first plurality of parallel bars printed in a first direction and a second plurality of parallel bars printed in a second direction perpendicular to said first direction; and said decoding means selects between said character processing mode and said image processing mode in response to the number of said first plurality of bars printed on said medium.

10. A system as in claim 9 wherein said image processing means processes areas delimited by at least one of said first plurality of bars if none of said second plurality of bars also delimits said areas, and processes only the portion of areas delimited by at least one of said first plurality of bars which is also delimited by at least one of said second plurality of bars if at least one of said second plurality of bars also delimits said areas.

11. A system as in claim 10 wherein said image processing means processes the portion of areas delimited by all of said second plurality of bars delimiting said areas.

12. A system for automatically reading information imprinted on a medium, said system comprising:

scanning means for optically reading information imprinted on a medium, said imprinted information including means for delimiting areas of said medium to be read, said delimiting means comprising a subset of a plurality of possible printed bars, the length of said bars delimiting the range of said areas in two coordinate dimensions, the number of said bars encoding one of a plurality of predetermined commands, said plurality of commands including a character processing command, a skip command, an image processing command and an end of processing command, said scanning means also for converting said read information into electrical signals;

decoding means, connected to receive said electrical signals, for decoding said control information from the number of bars read by said scanning means and for selecting between a character processing mode and an image processing mode in response to said decoded control information;

character processing means, connected to receive said signals, for processing information read from areas of said medium delimited by said delimiting means as character symbols when said decoding means selects said character processing mode; and image processing means, connected to receive said signals, for processing information read from areas of said medium delimited by said delimiting means as image patterns when said decoding means selects said image processing mode, wherein said decoding means disables both said character processing means and said image processing means from processing signals corresponding to information read from areas of said medium delimited by said delimiting means encoding said skip command, and causes said system to terminate processing of said information read from said medium in response to said end of processing command.

* * * * *